United States Patent Office 2,794,824
Patented June 4, 1957

2,794,824

PREPARATION OF TETRACYANOETHYLENE

Richard Edwin Heckert, Chesterfield County, Va., and Ernest Lewis Little, Jr., Wilmington, Del., assignors to E. I. du Pont de Nemours and Company, Wilmington, Del., a corporation of Delaware No Drawing. Application April 5, 1955,
Serial No. 499,541

10 Claims. (Cl. 260—465.8)

This invention is concerned with a new process for preparing unsaturated compounds, and is more particularly concerned with the preparation of tetracyanoethylene.

In the copending application of Cairns and Graef, Serial No. 382,842, filed September 28, 1953, and assigned to the assignee of the present application, there has been shown the preparation of tetracyanoethylene by the reaction of malononitrile with sulfur monochloride. This process represents a practical method for the preparation of tetracyanoethylene, and it is particularly useful in preparing tetracyanoethylene for uses in which a high state of purity is not essential. However, the reaction of malononitrile with sulfur monochloride gives sulfur as a by-product. This sulfur, along with small amounts of tar-like residues which are always formed in this process, can be rigorously separated from tetracyanoethylene, but known purification treatments, such as sublimation, are costly. For the preparation of commercial quantities of highly purified tetracyanoethylene, such a process appears to be economically undesirable.

It is an object of the present invention to provide a new process for the prepaartion of tetracyanoethylene. A further object is to provide an economical process for preparing tetracyanoethylene in a high state of purity. Other objects of the invention will become apparent from the specification and claims.

There has now been discovered a process for the preparation of tetracyanoethylene by the reaction of a dihalomalononitrile with a metallic reactant of the class consisting of metals and cyanides thereof. The by-products of this process are inorganic salts, from which a solution of tetracyanoethylene in a hot organic solvent is readily separated, as by filtration. Tetracyanoethylene in a high state of purity can be obtained by crystallization from the organic solvent. Suitable dihalomalononitriles are those in which both hydrogens of malononitrile have been replaced with halogen substituents having molecular weights of at least 35, i. e. chlorine, bromine and iodine. The dihalomalononitrile may be introduced into the reaction as a complex with an alkali metal halide.

While the presence of a liquid diluent is not essential to the reaction of a dihalomalononitrile with the metals or metal cyanides noted above, it is preferred to carry out the reaction in the presence of an inert organic liquid in order to obtain more uniform dissipation of the heat of reaction. An economy of operation is effected when the liquid used for this purpose is a solvent for tetracyanoethylene so that separation of the by-products can be made by simple filtration of the hot mixture resulting from the reaction. For this purpose, it is further preferred that the organic liquid be non-polar since such a liquid permits a maximum latitude of time in the recovery of tetracyanoethylene from the reaction mixture. Certain polar organic liquids, for example, the alcohols, are capable of reaction with tetracyanoethylene. When such a liquid is present in the medium for the present process, it is necessary to separate the tetracyanoethylene as rapidly as possible to avoid undue loss by reaction with the solvent.

For the purposes of the present invention, a complex of dihalomalononitrile with an alkali metal halide is an especially convenient form for supplying the dihalomalononitrile to the reaction.

In a preferred embodiment of the invention, the dihalomalononitrile, conveniently in the form of a complex with an alkali metal halide, is mixed with a molecular excess of powdered copper or copper cyanide in an anhydrous non-polar organic solvent. The reaction mixture is heated at reflux temperature until the reaction of the dihalomalononitrile with copper to yield tetracyanoethylene and copper halide is complete. The reaction is as follows when using the potassium bromide complex of dibromomalononitrile:

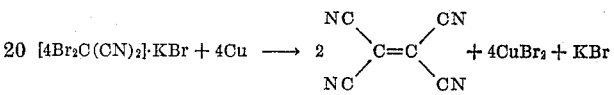

The mixture is filtered while hot to remove inorganic salts, such as the copper bromide and potassium bromide in the illustration, and excess copper. Crystalline tetracyanoethylene is then obtained as a precipitate by cooling the filtrate.

Dibromomalononitrile-potassium bromide complex ([4Br₂C(CN)₂]·KBr) for use in the reaction illustrated may be prepared as follows in a manner similar to that of Ramberg and Widequist:[1]

To a cold solution (5–10° C.) of 300 g. (4.54 moles) of malononitrile and 255 g. (2.15 moles) of potassium bromide in 2,800 ml. of distilled water is added 1,485 g. (9.3 moles) of bromine with stirring. The addition is made over a period of three hours. The stirring is continued for an additional 2–3 hours, while the temperature is maintained at 5–10° C. The precipitated solid complex is collected by filtration, washed with ice water, and sucked as dry as possible. The almost colorless crystalline complex is dried at high vacuum over phosphorus pentoxide at room temperature. The yield is 970 g. (85%).

*Analysis.*—Calcd. for $C_{12}Br_9N_8K$: C, 14.20; K, 3.85. Found: C, 14.19; K, 4.21.

Other complexes of dihalomalononitriles may be prepared in a similar manner.

In the following examples, which illustrate preferred embodiments of the invention, parts are by weight.

Example I

In a glass reactor, 16 parts of dibromomalononitrile and 30 parts of powdered zinc are mixed and heated to initiate the reaction. The external heat is then withdrawn, and a violent exothermic reaction occurs with evolution of dense while fumes. When the reaction is complete, white, needle-like crystals of tetracyanoethylene are found deposited on the upper walls of the reactor. The tetracyanoethylene is separated from excess zinc and some carbonaceous residues by extraction with 88 parts of boiling benzene. Crystalline tetracyanoethylene is recovered by evaporation of the benzene solution. The yield ranges from 13% to 20%, based on dibromomalononitrile. The identity of the product as tetracyanoethylene is established by the following test:

A portion of the product is dissolved in benzene to obtain the yellow-colored solution characteristic of the dissolved complex of tetracyanoethylene and benzene. To this solution anthracene is added. The solution imme-

---

[1] Ramberg and Widequist, Arkiv Kemi Mineral. Geol., 12A, No. 22 (1937).

diately turns green which is the characteristic color of the 1:1π complex of tetracyanoethylene with anthracene. White crystals of the Diels-Alder adduct of tetracyanoethylene and anthracene soon separate from this solution. These crystals are separated and dried, and their identity with an authentic sample of the tetracyanoethylene/anthracene Diels-Alder adduct is confirmed by the identity of their infrared absorption spectra. Diels-Alder adducts of tetracyanoethylene are the subject of the copending application of Heckert and Searle, Serial No. 399,566, filed December 21, 1953, and assigned to the assignee of the present application.

*Example II*

In a glass reactor fitted with a reflux condenser, a mixture of 358 parts of cuprous cyanide and 224 parts of dibromomalononitrile is heated by means of an oil bath covering the lower half of the reactor. When the bath is at 40° C., white crystals start to form on the walls of the cooler parts of the apparatus. When the oil bath is at 55° C., a vigorous exothermic reaction is initiated with the deposition of white crystals throughout the apparatus, and some of the product is lost through the top of the condenser because of the violence of the reaction. Thirty parts of white crystals are collected by scraping the walls of the condenser. This crystalline material is identified as tetracyanoethylene by the identity of the infrared absorption spectrum with that of an authentic sample of tetracyanoethylene.

*Example III*

In a glass reactor fitted with a reflux condenser, 150 parts of dibromomalononitrile and 500 parts of copper powder are mixed. An exothermic reaction takes place immediately without external heating. This reaction is complete within about ten minutes. After the reaction mass has cooled, it is extracted with diethyl ether. The filtered ether solution is evaporated to dryness, and the crude tetracyanoethylene which is deposited is purified by sublimation. The yield of purified tetracyanoethylene is 25 parts (29%).

*Example IV*

In a glass reactor fitted with a reflux condenser, 2 parts of magnesium turnings and 1 part of dibromomalononitrile are mixed. This mixture is heated to reflux temperature. This initiates a moderately vigorous exothermic reaction which continues for several minutes. Dense fumes are evolved, and crystalline tetracyanoethylene is deposited on the walls of the upper portion of the reactor. The crystalline tetracyanoethylene is collected by scraping. It is identified as tetracyanoethylene by the preparation of the Diels-Alder adduct of tetracyanoethylene and anthracene as in Example I.

*Example V*

In a glass reactor, a mixture of 224 parts of dibromomalononitrile and 351 parts of zinc cyanide is heated slowly to 150° C. over a period of two hours. At this temperature a spontaneous exothermic reaction takes place which continues for ten to fifteen minutes. When this has subsided, the reaction mass is subjected to sublimation, and 30 parts of tetracyanoethylene is obtained.

*Example VI*

Five parts of powdered copper and 11 parts of the dibromomalononitrile/potassium bromide complex are mixed and heated as in Example I. The exothermic reaction which takes place gives a 15% yield of crystalline tetracyanoethylene.

*Example VII*

In a glass reactor fitted with a reflux condenser, a mixture of 10 parts of dibromomalononitrile/potassium bromide complex and 5 parts of powdered copper suspended in 44 parts of anhydrous benzene is heated to reflux at ten minute intervals interspersed with agitation of the mixture in the absence of added heat over a period of two hours. The mixture is allowed to settle, and the supernatant benzene solution is drained off. This solution is colored a deep yellow characteristic of the benzene/tetracyanoethylene complex, and the presence of tetracyanoethylene is further confirmed by the strong green color produced when anthracene is added to the solution.

*Example VIII*

A mixture of 500 parts of dibromomalononitrile/potassium bromide complex and 250 parts of copper powder in 1,760 parts of dry benzene is refluxed with stirring for three hours. The mixture is filtered while hot. The solid residue is slurried with 660 parts of hot benzene and filtered. The combined benzene solutions are concentrated by distillation under reduced pressure to approximately ⅙ the original volume and cooled at 5° C. The solid tetracyanoethylene which crystallizes is collected by filtration and dried. Weight 55 parts. An additional 9 parts of product is obtained by further concentration of the mother liquor. The yield of crude tetracyanoethylene is 51%. A sample recrystallized from ether melts at 201–202 C.; its color reactions and infrared absorption spectrum agree with those of an authentic sample of tetracyanoethylene.

The process of Example VIII is repeated using toluene in place of benzene. A similar yield of tetracyanoethylene is obtained. The process of Example VIII is again repeated using chlorobenzene in place of benzene, and a similar yield of tetracyanoethylene is obtained.

*Example IX*

The process of Example VIII is repeated, except that the heating period is increased to sixteen hours. The yield of crude tetracyanoethylene is 62.7%. The well-defined crystals obtained upon recrystallization from chlorobenzene melt at 199–200° C. and give no depression of melting point on admixture with an authentic sample.

*Analysis.*—Calcd. for $C_6N_4$: C, 56.30; N, 43.70. Found: C, 56.42, 56.39; N, 43.50, 43.23.

*Example X*

In a glass reactor, 88 parts of benzene, 20 parts of dibromomalononitrile/potassium bromide complex and 20 parts of a powder of one of the metals shown below are stirred and heated at reflux for two hours. The preparation is repeated with each of the metals shown, and the presence of tetracyanoethylene in the reaction mixtures is confirmed by the green color produced on the addition of anthracene in the identification test as described in Example I.

| Metal | Anthracene Test for Tetracyanoethylene |
| --- | --- |
| Antimony | Positive. |
| Mercury | Do. |
| Iron | Do. |
| Tin | Do. |
| Tantalum | Do. |
| Nickel | Do. |
| Zirconium | Do. |
| Silver | Do. |
| Aluminum | Do. |

*Example XI*

In a glass reactor, 88 parts of benzene, 20 parts of dibromomalononitrile and 20 parts of one of the powdered metals shown below are stirred and heated at reflux for two hours. The preparation is repeated with each of the metals shown, and the presence of tetracyanoethylene in the reaction mixtures is confirmed by the green color produced on the addition of anthracene in the identification test as described in Example I.

| Metal | Anthracene Test for Tetracyanoethylene |
|---|---|
| Aluminum | Positive. |
| Bismuth | Do. |
| Lead | Do. |
| Molybdenum | Do. |
| Nickel | Do. |
| Sodium | Do. |
| Tin | Do. |

The physical form of the metal or metal cyanide employed in the process of this invention is not critical. However, to obtain a practical yield of tetracyanoethylene in a reasonable length of time, it is preferred to employ the metal or metal cyanide in divided form as in a powder. For very best results, the powder should be fine enough to pass a 40-mesh screen.

The process of the present invention is generic to the reaction of a dihalomalononitrile or an alkali halide complex of a dihalomalononitrile with a metal or a cyanide of a metal. The mechanism by which tetracyanoethylene is formed in this reaction may be visualized as a dehalogenation of the dihalomalononitrile accompanied by coupling of the $(CN)_2C=$ radicals so formed.

Metals and the cyanides of metallic elements are broadly operable in the process of the present invention. However, there are substantial differences in the rate of reaction and the yield of tetracyanoethylene obtained with the various metals and metal cyanides. Accordingly, for commercial operation, copper and copper cyanide are preferable because, with them, maximum reaction rates and yields are obtained. Approaching copper in activity and therefore only slightly less preferred are the remaining metals (and their cyanides) in group I of the periodic table and the metals (and their cyanides) in group II, particularly silver, magnesium, zinc, mercury, and their cyanides.

For the purposes of the present invention, suitable dihalomalononitriles in which chlorine, bromine or iodine has replaced both of the hydrogen atoms of the malononitrile include the dihalomalononitriles shown by Hesse, Am. Chem. J., 18, 726 (1896) and by Ott and Löpmann, Ber. 55B, 1255–61 (1922) and the complexes with sodium chloride, sodium bromide, sodium iodide, potassium bromide and potassium iodide shown by Ott and Weissenburger, Ber. 70B, 1829–34 (1937). When any of these dihalomalononitrile compounds react with a metal or a cyanide of a metal, tetracyanoethylene is formed. When a compound of a metal other than the cyanide, for example, cupric chloride, is employed with a dihalomalononitrile, no tetracyanoethylene is obtained.

While the process of the present invention can be carried out in the presence of small amounts of water, highest yields of tetracyanoethylene are realized when the reaction system is substantially anhydrous. For this purpose, it is accordingly preferred to employ carefully dehydrated starting materials.

The process of the present invention can be carried out at room temperature, but, to bring it to completion in a reasonable period of time, it is preferred to employ reaction temperatures in excess of 50° C. The reaction is exothermic and, if suitable means for dissipation of heat of reaction are not employed, excessively high temperatures will lead to a loss of product through the formation of carbonaceous residues. Such a loss can generally be avoided by operating at temperatures of 150° C. and below.

The non-polar organic liquids which are the preferred media for carrying out the process of this invention are the hydrocarbons and the fluorinated hydrocarbons, i. e., pentane, hexane, octane, decane, cyclohexane, benzene, toluene, xylene and their fluorine-substituted analogs. Non-polar compounds which are gases under ordinary conditions may be employed as media for the process of this invention by the expedient of operating in a closed system under superatmospheric pressure. Pressure is not a critical factor in the process of this invention.

Because the tetracyanoethylene prepared by the process of this invention can be readily obtained in a high state of purity by recrystallization, this process represents a particularly suitable source of tetracyanoethylene to be employed in the preparation of polymers and copolymers as shown in the aforementioned copending application of Cairns and Graef, Serial No. 382,842.

Since many different embodiments of the invention may be made without departing from the spirit and scope thereof, it is to be understood that the invention is not limited by the specific illustrations except to the extent defined by the following claims.

What is claimed is:

1. A process for preparing tetracyanoethylene which comprises reacting a dihalomalononitrile, wherein the halogen substituents have molecular weights of at least 35, with a metallic reactant of the class consisting of metals and cyanides thereof, whereby tetracyanoethylene is produced, and thereafter separating the tetracyanoethylene from the reaction mixture.

2. A process for preparing tetracyanoethylene which comprises reacting a dihalomalononitrile, wherein the halogen substituents have molecular weights of at least 35, with a metallic reactant of the class consisting of metals and cyanides thereof in the presence of an inert organic liquid.

3. A process as defined in claim 2 wherein the organic liquid is a non-polar solvent for tetracyanoethylene.

4. A process as defined in claim 2 wherein the organic liquid is a solvent for the tetracyanoethylene and the tetracyanoethylene formed is obtained in a high state of purity by filtering the reaction mixture and crystallizing tetracyanoethylene from the solvent.

5. A process as defined in claim 2 wherein a molecular excess of the metallic reactant is used.

6. A process as defined in claim 2 wherein the metal is in group I of the periodic table.

7. A process as defined in claim 2 wherein the metal is in group II of the periodic table.

8. A process as defined in claim 2 wherein the metal is copper.

9. A process as defined in claim 2 wherein the temperature is 50° to 150° C.

10. A process as defined in claim 2 wherein the dihalomalononitrile is in the form of a complex with an alkali metal halide.

References Cited in the file of this patent

Conrad et al.: Ber. Deut. Chem., vol. 16, page 2631 (1883).

Conrad et al.: Ber. Deut. Chem., vol. 24, page 3004 (1891).